United States Patent
Glover et al.

(10) Patent No.: US 7,882,069 B2
(45) Date of Patent: Feb. 1, 2011

(54) TAG BASED BACKUP AND RECOVERY

(75) Inventors: Fred S. Glover, Hollis, NH (US); David Akers, Merrimack, NH (US); James Beltz, New Boston, NH (US); Diane Lebel, Methuen, MA (US); Timothy Mark, Goffstown, NH (US); Brian Tsao, Nashua, NH (US); Angelo Pruscino, Los Altos, CA (US)

(73) Assignee: Oracle International Corp., Redwood Shores, CA (US)

( * ) Notice: Subject to any disclaimer, the term of this patent is extended or adjusted under 35 U.S.C. 154(b) by 388 days.

(21) Appl. No.: 12/070,528

(22) Filed: Feb. 19, 2008

(65) Prior Publication Data
US 2009/0210458 A1 Aug. 20, 2009

(51) Int. Cl.
*G06F 7/00* (2006.01)
*G06F 17/00* (2006.01)

(52) U.S. Cl. .................. 707/640; 707/657; 707/674; 711/162; 715/700

(58) Field of Classification Search ........... 707/639, 707/640, 653, 657, 674; 715/764, 771, 700; 711/162
See application file for complete search history.

(56) References Cited

U.S. PATENT DOCUMENTS

| | | | |
|---|---|---|---|
| 6,289,356 B1 * | 9/2001 | Hitz et al. ................ | 707/204 |
| 7,043,503 B2 * | 5/2006 | Haskin et al. ............. | 707/204 |
| 7,047,380 B2 * | 5/2006 | Tormasov et al. ......... | 711/162 |
| 7,155,465 B2 * | 12/2006 | Lee et al. ................. | 707/204 |
| 7,318,135 B1 * | 1/2008 | Tormasov et al. ......... | 711/162 |
| 7,340,520 B1 * | 3/2008 | Jordan et al. ............. | 709/226 |
| 7,406,473 B1 * | 7/2008 | Brassow et al. ........... | 707/204 |
| 7,437,676 B1 * | 10/2008 | Magdum et al. ........... | 715/738 |
| 7,447,709 B1 * | 11/2008 | Rozenman et al. ......... | 707/204 |
| 7,502,801 B2 * | 3/2009 | Sawdon et al. ............. | 707/204 |
| 7,526,495 B2 * | 4/2009 | Chai ........................ | 707/204 |
| 7,552,358 B1 * | 6/2009 | Asgar-Deen et al. ....... | 714/6 |
| 7,574,445 B2 * | 8/2009 | Chai ........................ | 707/204 |
| 7,707,184 B1 * | 4/2010 | Zhang et al. .............. | 707/645 |

(Continued)

OTHER PUBLICATIONS

Ames et al.—"Richer File System Metadata Using Links and Attributes"—Proceedings of the $22^{nd}$ IEEE / $13^{th}$ NASA Goddard Conferences on Mass Storage Systems and technologies (MSST'05) Apr. 11-14, 2005 (pp. 49-60).*

(Continued)

*Primary Examiner*—John E Breene
*Assistant Examiner*—Anh Ly
(74) *Attorney, Agent, or Firm*—Kraguljac & Kalnay, LLC

(57) ABSTRACT

Systems, methods, and other embodiments associated with selective tag-based file backup and recovery are described. One example method includes selectively tagging a file for inclusion in a snapshot-based backup image by associating a tag with the file. The associating may include encoding file metadata with a tag. The method may include selectively adding a file to the backup image upon determining that the file has experienced a write event and that the file is associated with a tag. The method may also include receiving a request to provide a recovery file from the backup image and selectively providing the recovery file upon determining that the recovery file is associated with a recovery tag specified in the request.

16 Claims, 6 Drawing Sheets

U.S. PATENT DOCUMENTS

| | | | |
|---|---|---|---|
| 2002/0057269 A1* | 5/2002 | Barber et al. | 345/418 |
| 2003/0159007 A1* | 8/2003 | Sawdon et al. | 711/154 |
| 2004/0210608 A1* | 10/2004 | Lee et al. | 707/204 |
| 2005/0027956 A1* | 2/2005 | Tormasov et al. | 711/162 |
| 2005/0050110 A1* | 3/2005 | Sawdon et al. | 707/201 |
| 2006/0206536 A1* | 9/2006 | Sawdon et al. | 707/200 |
| 2008/0034013 A1* | 2/2008 | Cisler et al. | 707/203 |
| 2008/0034268 A1* | 2/2008 | Dodd et al. | 714/755 |
| 2008/0034307 A1* | 2/2008 | Cisler et al. | 715/764 |
| 2008/0046483 A1* | 2/2008 | Lehr et al. | 707/204 |
| 2008/0126445 A1* | 5/2008 | Michelman | 707/204 |
| 2008/0133622 A1* | 6/2008 | Brown et al. | 707/204 |
| 2008/0307017 A1* | 12/2008 | Lyons et al. | 707/204 |
| 2008/0307333 A1* | 12/2008 | McInerney et al. | 715/764 |
| 2008/0307347 A1* | 12/2008 | Cisler et al. | 715/771 |
| 2009/0172322 A1* | 7/2009 | Gilpin et al. | 711/162 |

OTHER PUBLICATIONS

Wharton et al. "RedBooks paer—IBM Tivoli Storage manager"—2003 pp. 1-36.*

Yang et al. —"TRAP-Array: A disk Array Architecture providing Timely Recovery to Any Point-in-time"—Proceedings of the $33^{rd}$ International Conference on Computer Architecture (ISCA'06) IEEE-2006 pp. 289-301.*

* cited by examiner

TAG BASED BACKUP AND RECOVERY

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

File system administrators try to protect data against unrecoverable damage to file systems and storage systems that host the data. System administrators may employ backup utilities, copy-on-write file system snapshot utilities, and other data protection tools in this effort. A snapshot utility may, in real time, record persistent copies of changes to customer file data. These snapshot copies provide a space efficient approach to capture consistent states of active files undergoing changes. The snapshot copies can be used in both an on-line disk based backup solution, as well as the source of an off-line backup operation that protects against file system failure. Current data protection solutions, however, continue to require significant investments in hands-on administration, time allocation, and storage space consumption. Conventional protection schemes may support managing customer data with different granularities. In one case, all files may be backed up periodically and/or in response to an administrator-initiated action. In another case, only changed files may be backed up. Therefore, recovery scenarios may involve restoring all files or all changed files even though only some data in some file(s) may be required to effect recovery.

Some conventional systems may support individual file backup and recovery. However, these conventional systems may require exacting individual configuration, manipulation, and maintenance by a systems administrator having up-to-date backup and recovery plans at hand. The configuration and maintenance may include identifying the exact, fully qualified pathname location of a file to be backed up and/or recovered. Such pathnames are typically not presented in a graphical user interface, but rather are acquired from text-based command-line interfaces. Additionally, information concerning files to be backed up is typically not stored with the file itself, but rather resides in a backup utility data structure. If only selected files or subsets of files from a customer data set are required to be restored during a recovery operation, conventional solutions may require significant management, time, overhead, and unnecessary storage allocation for files that are swept up in over-inclusive conventional solutions. For example, if only 10% of the files in a given file system are required to be included in a backup set, then significant savings may result from the use of tag based snapshots as only 10% of the files would participate in the CPU, memory, and I/O processing associated with the Copy-On-Write semantics of snapshot management. Additional savings will result during subsequent restoration processing of files from the tag based backup set containing only 10% of the total file system population.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. An individual with ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
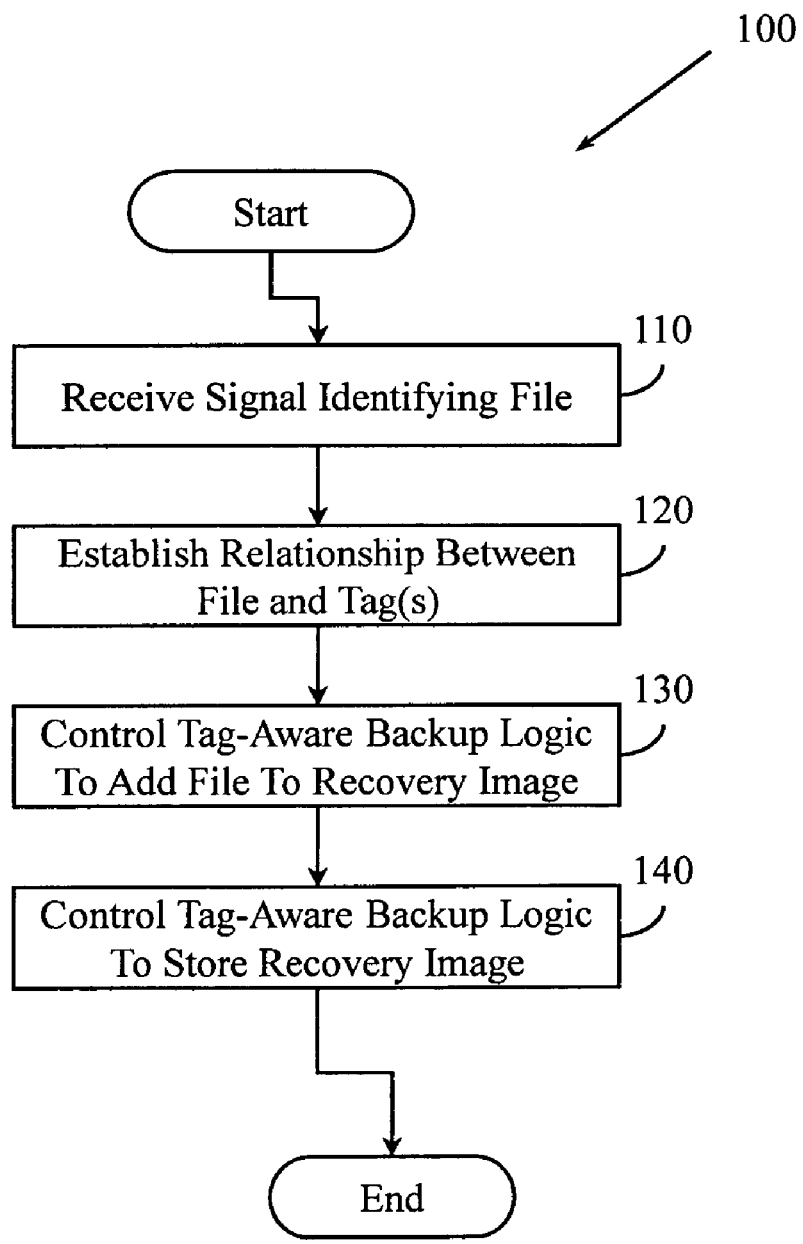
FIG. 1 illustrates an example method associated with tag based file system backup and recovery.

Example systems and methods described herein concern tag based file system backup and recovery. In one example, the backup may be a snapshot based capture. Selective tag based file snapshot capture and recovery may reduce administrative effort, time, and storage requirements over conventional systems. The reductions may be achieved by backing up and/or recovering only selected (e.g., tagged) data and/or files. Example systems and methods facilitate tagging individual files and/or groups of files for inclusion in snapshot and/or backup processing. Example systems and methods also facilitate selectively restoring data and/or files using individually tagged files and/or groups of files. Once tagged, a file or group of files can be identified and thus processed collectively based on the tag. The tag may reside with the data and/or file rather than being separately stored in a backup utility as is conventionally performed.

In one example, a file may be tagged with a user-defined tag to identify it as a target for tag-based file snapshot capture and/or recovery. Once assigned to a file, a tag facilitates locating individual files and/or groups of files since a tag can be specified rather than a file name and/or a complete file path. Files may be tagged at different times, may have a tag removed, may have a tag changed, and so on. Since the tag is persistent and related to the file, the file may be backed up by different tag-aware and/or non-tag-aware backup utilities. This facilitates a "tag-once" mentality where the file is identified as a backup target that may then be processed by different utilities, both tag-aware and/or non-tag-aware. A tag-aware utility may look for tags and build a recovery image selectively based on tags. Conventional systems may be based on a "configure many" mentality where each backup utility would need to be painstakingly configured.

Tagged files may be processed in different manners depending on how a backup operation occurred and when tags were applied. In a first scenario, complete snapshot and/or backup operations may have stored all files and/or all changed files independent of the presence of any tags. The complete snapshot and/or backup may have been performed in accordance with a pre-defined protection plan and/or in response to an initiating action. The snapshot and/or backup operations may have been performed before individual files and/or groups of files were tagged or after files had been tagged in a first way that is unrelated to a later performed recovery operation. For example, files may have been tagged at a first time from a first point of view to support a first recovery operation but a second recovery operation may require a second (e.g., different) set of files to be restored during its operation. Thus, the first set of tagged files may not be relevant to the second recovery operation.

Additionally, the snapshot and backup operation may have occurred before specific file recovery requirements were known, defined, and/or implemented. Thus, all files modified during a snapshot window time period may appear in the snapshot image. At a later point in time, a recovery operation may be undertaken. This recovery operation may require only a subset of data and/or files from the complete set acquired during the snapshot and backup. Thus, example systems and methods provide a tag based snapshot recovery scheme that facilitates identifying a set of recovery files using a tag name (s). The tag-based approach relieves an administrator from the burden of managing backup and/or snapshot and recovery operations with fully qualified path names. In one example, tags may be applied to files without requiring the tagger (e.g., system administrator) to specify the fully qualified pathname. For example, files may be tagged while being viewed in a file system viewer (e.g., navigation pane). Similarly, tag names for files to be recovered from an over-inclusive snapshot and/or backup may be specified without using fully qualified pathnames.

In a second scenario, example systems and methods facilitate optimized creation of tag based snapshot images. A tag based snapshot design supports administrative directives to capture changes for only those files marked with a selected tag(s). Thus, tag-aware snapshot image logic may build a snapshot image using only tagged files that have been changed. This scenario may occur when a user, enterprise, or other entity has a priori knowledge of which files will be necessary for a future recovery operation. In this example, recovery of data and/or files may also be enhanced. In one example, a subset of tagged files may be recovered from a larger set of tagged files. The larger set of tagged files may have been backed up at a previous time using tag based snapshot systems and methods, or the larger set of tagged files may include a wider range of tag names and associated file candidates than is required for this specific recovery operation. Additionally, a set of tagged files may be recovered from a larger set of tagged and not tagged files. This larger and/or complete set of files may have been backed up at a previous time using non-tag-based snapshot and recovery.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
XML: extensible markup language.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable storage medium", as used herein, refers to a medium that stores signals, instructions, and/or data. A computer-readable storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable storage medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to, hardware, firmware, and/or combinations of each to perform a function(s) or an action(s), and/or to cause a function or action from another logic, method, and/or system. Logic may include a discreet logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instructions that cause a computer, processor, or other electronic device to perform functions, actions and/or behave in a desired manner. "Software" does not refer to stored source-level instructions being claimed as stored source-level instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with tag-based recovery image creation. Method 100 may include, at 110, receiving a signal that identifies a file that is to be selectively processed by a tag-aware backup logic. The tag-aware backup logic participates in producing a recovery image. In one example, the signal may be received from a file selection logic. The file selection logic may provide a graphical user interface (GUI) that displays a graphical representation of an element of a file system. For example, a navigation pane may display an arrangement of folders with which sets of files may be associated. The navigation pane may also display an arrangement of files. Using this file selection logic a file to be tagged and selectively backed up can be selected without specifying a path name. Additionally, groups of files and/or folders may be collectively tagged.

Method 100 may also include, at 120, establishing a relationship between the file and a recovery image inclusion tag. In one example, establishing the relationship between the file and the recovery image inclusion tag includes encoding the recovery image inclusion tag into metadata in the file. Files typically include metadata that describes, for example, a file name, a file size, a file type, a file encoding, and so on. In one example, encoding the tag into the file metadata may include adding a new metadata field to a file. This additional metadata field may store the tag. The data encoded into the additional metadata field may be, for example, a user-defined, user-readable string (e.g., backup_1), a user-defined numeric code, an identifier (e.g., URL), and so on. While an additional metadata field is described, it is to be appreciated that in one example an existing metadata field may be repurposed to store the tag. In one example, establishing the relationship between the file and the recovery image inclusion tag includes encoding the recovery image inclusion tag into metadata associated with the file. In this example, the tag is not encoded into metadata in the file but rather is encoded into metadata associated with the file. This metadata may reside outside the file and may be pointed to by a pointer in the file. Once again, an additional metadata field may be added to a set of metadata associated with a file and/or an existing metadata field may be repurposed.

A file may be associated with a set of tags. In different examples the set of tags may include different numbers of members. Consider a file that may be used by two different entities in an enterprise, (e.g., accounts receivable, accounts payable). In this case, the file may be associated with tags used by each entity and thus may be added to recovery images intended to restore processing for either of the entities. Consider another file that may only be used by one entity and that is to be reserved for use by that entity and protected from other entities. In this case, the file may be associated with tags used by only that one entity. Some files may be of general interest but not so intimately associated with the mission critical aspect of any individual entity that they are not tagged for special processing. These files may be subject only to general backup processes. In this case, the file may still be added to a recovery image but may not be individually recoverable by a tag-aware recovery logic based on a tag. Instead these files may only be generally recoverable by a general recovery utility. These different scenarios illustrate that in different examples a recovery image may have different members and mixes of members where some may be added by a tag-aware logic and others added by a non-tag-aware logic.

Method 100 may also include, at 130, controlling the tag-aware backup logic to selectively automatically add the file to the recovery image. Controlling the logic may include sending a signal to the logic, invoking a method associated with the logic, providing an electrical input to a circuit in the logic, and so on. Whether the file is added to the recovery image may depend on the relationship between the file and the recovery image inclusion tag. For example, files that are associated with a particular tag may be added to the recovery image while files that are either associated with no tag or associated with a different tag may not be added to the recovery image. In one example, the tag-aware backup logic may add the file to the recovery image using copy-on-write snapshot processing. Thus, when a write to the file is detected, the file and/or changed data associated with the file may be copied to the recovery image.

As described above, files may be associated with no tag, may be associated with a single tag, may be associated with a set of tags, and so on. Therefore, the recovery image may have different members and mixes of members. In one example, the recovery image may include a set of files having a relationship with a recovery image inclusion tag and may also include a set of files not having a relationship with a recovery image inclusion tag. In another example, the recovery image may include a first set of files associated with a first recovery image inclusion tag and may also include a second set of files associated with a second, different, recovery image inclusion tag. While two sets of files are described, more generally the recovery image may include N sets of files associated with N different image inclusion tags, N being an integer. In one case, N may be one and thus all the files in the recovery image may be associated with a single recovery image inclusion tag.

Method 100 may also include, at 140, controlling the tag-aware backup logic to store the recovery image on a computer-readable storage medium. Controlling the logic may include providing a signal to the logic, invoking a method provided by the logic, operating a circuit associated with the logic, and so on. In different examples the storing may be done in response to a user signal, may be done automatically in response to a system signal, may be done periodically, and so on.

While FIG. 1 illustrates various actions occurring in serial, it is to be appreciated that various actions illustrated in FIG. 1 could occur substantially in parallel. By way of illustration, a first process could receive signals identifying files, a second process could establish relationships between files and tags, and a third process could control a tag-aware backup logic to add files to a recovery image and to store the recovery image. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., processor) cause the machine to perform method 100. While executable instructions associated with the method 100 are described as being stored on a computer-readable storage medium, it is to be appreciated that executable instructions associated with other example methods described herein may also be stored on a computer-readable medium.

Figure 2:
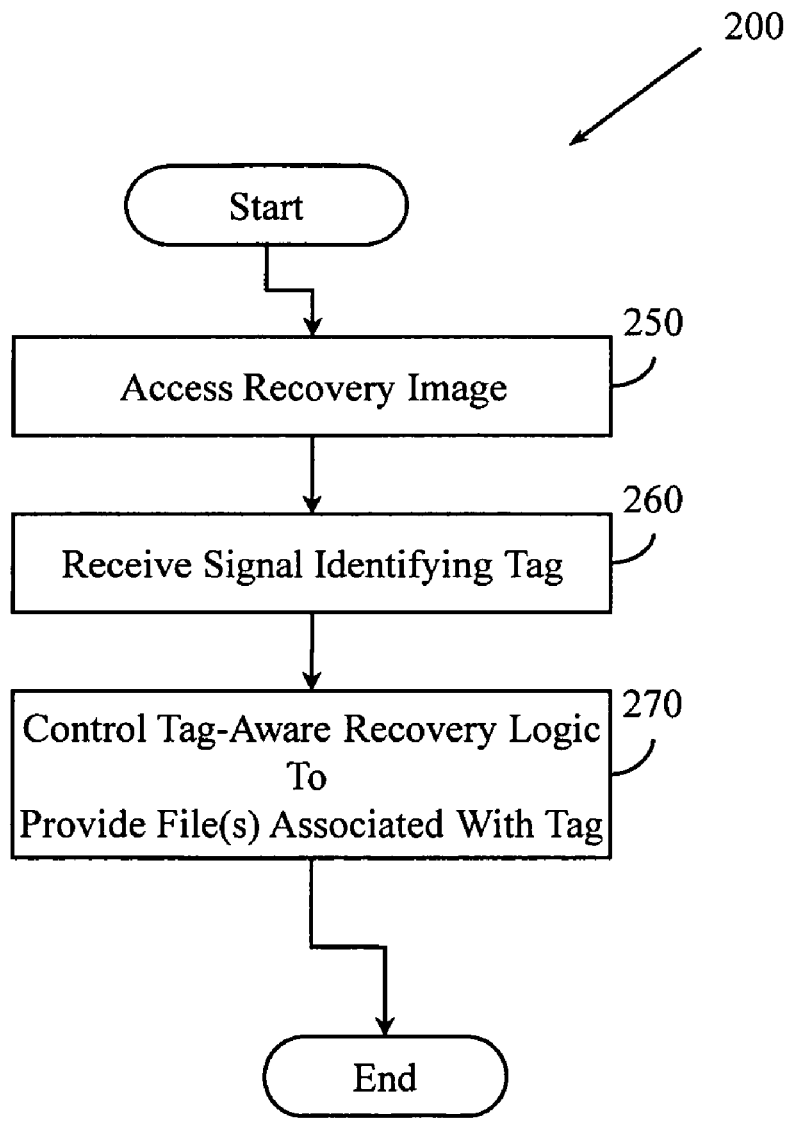
FIG. 2 illustrates another example method associated with tag based file system backup and recovery.

FIG. 2 illustrates a method 200 associated with selectively retrieving files from a recovery image that includes files associated with tags. Method 200 may include, at 250, accessing a recovery image that includes a set of files having a relationship with a recovery image inclusion tag. Accessing the recovery image may include, for example, opening a file, opening a stream, mounting a portion of a network file system, and so on. Since some files may be tagged, method 200 may be able to recover specific files based on their tags rather than performing complete recovery and/or filename/pathname based recovery.

Method 200 may also include, at 260, receiving a signal that identifies a recovery tag associated with a file to be recovered from the recovery image. The recovery tag may be, for example, a user-readable, user-provided text string, a numeric identifier, an encrypted string, a binary pattern, and so on. In one example, the recovery tag is provided by a file selection logic that provides a GUI that displays a graphical representation of a file system. The GUI may facilitate selecting the file without providing a path name. For example, a user may click on a graphical representation of a file rather than spell out its path name.

With the recovery tag available, method 200 may continue, at 270, by controlling a tag-aware recovery logic to selectively automatically provide a file from the recovery image. Whether the file is provided may depend on a relationship between the recovery tag and the recovery image inclusion tag. For example, files that include the recovery tag may be provided, files that do not include the recovery tag may be provided, and so on. In different examples, the recovery image inclusion tag may be embedded in metadata in the file and/or may be embedded in metadata associated with the file. While an embedded tag is described, it is to be appreciated that the tag value may be encoded into file metadata.

The recovery image from which a file may be recovered may have different members and mixtures of members. For example, the recovery image may include a set of files having a relationship with a recovery image inclusion tag and a set of files not having a relationship with a recovery image inclusion tag. Thus, a file associated with a recovery tag may be pulled out of a larger set of files, some of which are tagged and some of which are not. Alternatively, only files of general interest (e.g., non-tagged files) may be extracted. The selective extraction may be tag based rather than filename/pathname based. The recovery image may include different sets of files associated with different recovery image inclusion tags. Thus, a set of files associated with one of the recovery tags may be extracted to restore an image for a certain entity while files preserved for another entity are not extracted. In one example the recovery image may only include files associated with a single recovery image inclusion tag. In this case, a number of images may exist and an entire image may be selected based on the tag.

Figure 3:
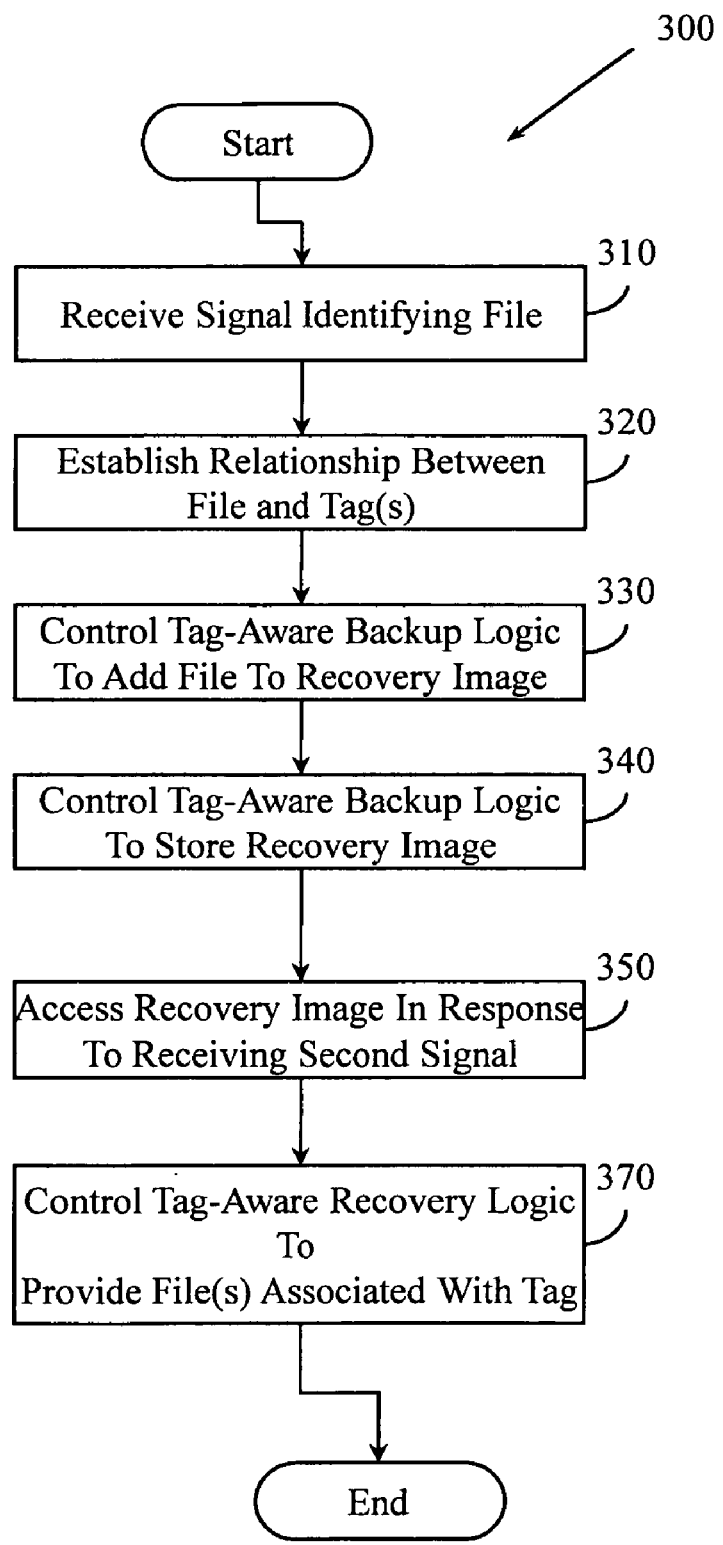
FIG. 3 illustrates another example method associated with tag based file system backup and recovery.

FIG. 1 illustrated a method 100 for putting things (e.g., tagged files) into a recovery image that may include both tagged and/or non-tagged items. FIG. 2 illustrated a method 200 for taking things (e.g., tagged files) out of a recovery image that may include tagged and/or non-tagged files. FIG. 3 illustrates a method 300 associated with both putting things into a recovery image and taking things out of the recovery image. Thus, method 300 includes actions similar to those associated with both method 100 (FIG. 1) and method 200 (FIG. 2).

Method 300 includes, at 310, receiving a first signal that identifies a file to be included in a recovery image and, at 320, establishing a relationship between the file and a recovery image inclusion tag. Method 300 also includes, at 330, controlling a tag-aware backup logic to selectively add a file to a recovery image and, at 340, storing the recovery image. Controlling the tag-aware backup logic may include, for example, sending a signal to the logic, sending a message to the logic, instantiating an instance of an object that implements the logic, powering up a circuit that implements the logic, and so on. With the stored recovery image available, method 300 also includes, at 350, accessing the stored recovery image in response to receiving a second signal that identifies a recovery tag associated with a recovered file to be recovered from the recovery image. Accessing the stored recovery image may include, for example, acquiring a file handle, acquiring a file descriptor, opening a file, opening a communication path to a physical device(s) on which the recovery image is stored, mounting a computer-readable storage medium on which the recovery image is stored, and so on.

Having received the second signal, method 300 proceeds, at 370, with controlling a tag-aware recovery logic to selectively automatically provide the recovered file from the recovery image. Providing the recovered file may include, for example, sending the file to a receiver via a computer communication, storing the recovered file in a data store, storing the recovered file on a computer-readable storage medium, and so on. Whether a file will be provided from the recovery image may depend, at least in part, on a relationship between the recovery tag and a tag encoded in metadata in and/or associated with the recovered file. For example, a file whose metadata includes the tag may be provided while a file whose metadata does not include the tag may not be provided.

Figure 4:
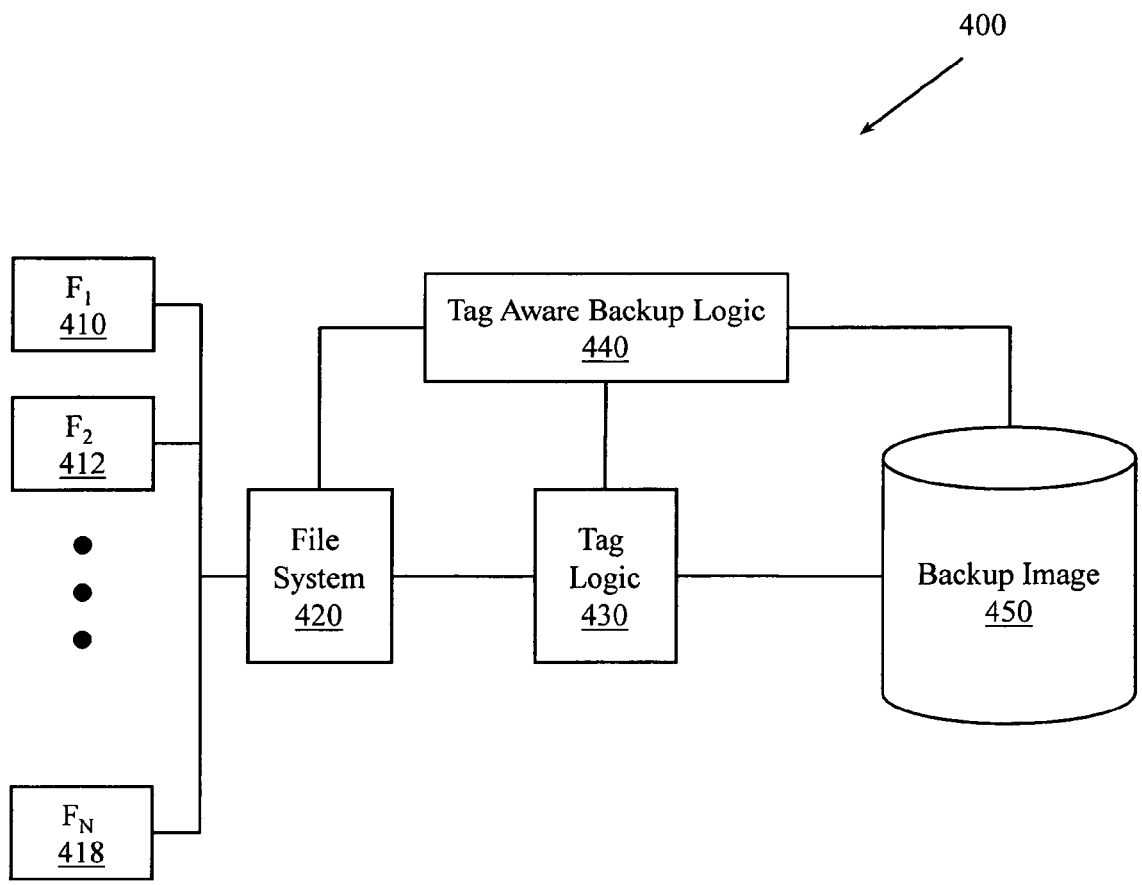
FIG. 4 illustrates an example system associated with tag based file system backup and recovery.

FIG. 4 illustrates a system 400 that performs selective tag-based backup. System 400 includes a tag logic 430 that configures a file(s) to be included in a backup image 450. A set of files including, for example, $F_1$ 410, and $F_2$ 412 through $F_N$ 418, N being an integer, may be accessible to tag logic 430 through a file system 420. Thus, the tag logic 430 may manipulate metadata associated with a file to configure that file for selective inclusion in the backup image 450. The tag logic 430 may associate a tag with a file by, for example, embedding a tag in metadata in the file, embedding a tag in metadata associated with the file, and so on. Thus, tag logic 430 may write to a file, may write to metadata associated with a file, and so on.

System 400 also includes a tag-aware backup logic 440 that selectively adds a file to the backup image 450. Whether a file is added to the backup image 450 may depend, at least in part, on whether the file has been configured by the tag logic 430 to be included in backup image 450. In one example, tag-aware backup logic 440 may store all files associated with file system 420 regardless of whether any individual file has been tagged. In this case, both files tagged by tag logic 430 and files not tagged by tag logic 430 may appear in backup image 450. In this example the number of files stored in backup image 450 is not reduced as compared to conventional systems. However, files stored in this type of backup image 450 may subsequently be selectively removed from the backup image 450 based on tag information stored in file metadata. In another example, tag-aware backup logic 440 is configured to perform a copy-on-write snapshot procedure where a tagged file is added to the backup image 450 upon determining that the tagged file has experienced a write operation. In this example the number of files written to backup image 450 may be less than the number of files written by a conventional system.

In different examples, tag-aware backup logic 440 may produce a backup image 450 having different types and mixtures of files. For example, tag-aware backup logic 440 may produce a mixed backup image 450 that includes a set of files that are associated with tags and a set of files that are not associated with tags. Tag-aware backup logic 440 may also produce a multi-tag backup image 450 that includes a first set of files associated with a first tag and a second set of files associated with a second tag. Tag-aware backup logic 440 may also produce a single tag backup image 450 that includes only files that are associated with a single tag.

Figure 5:
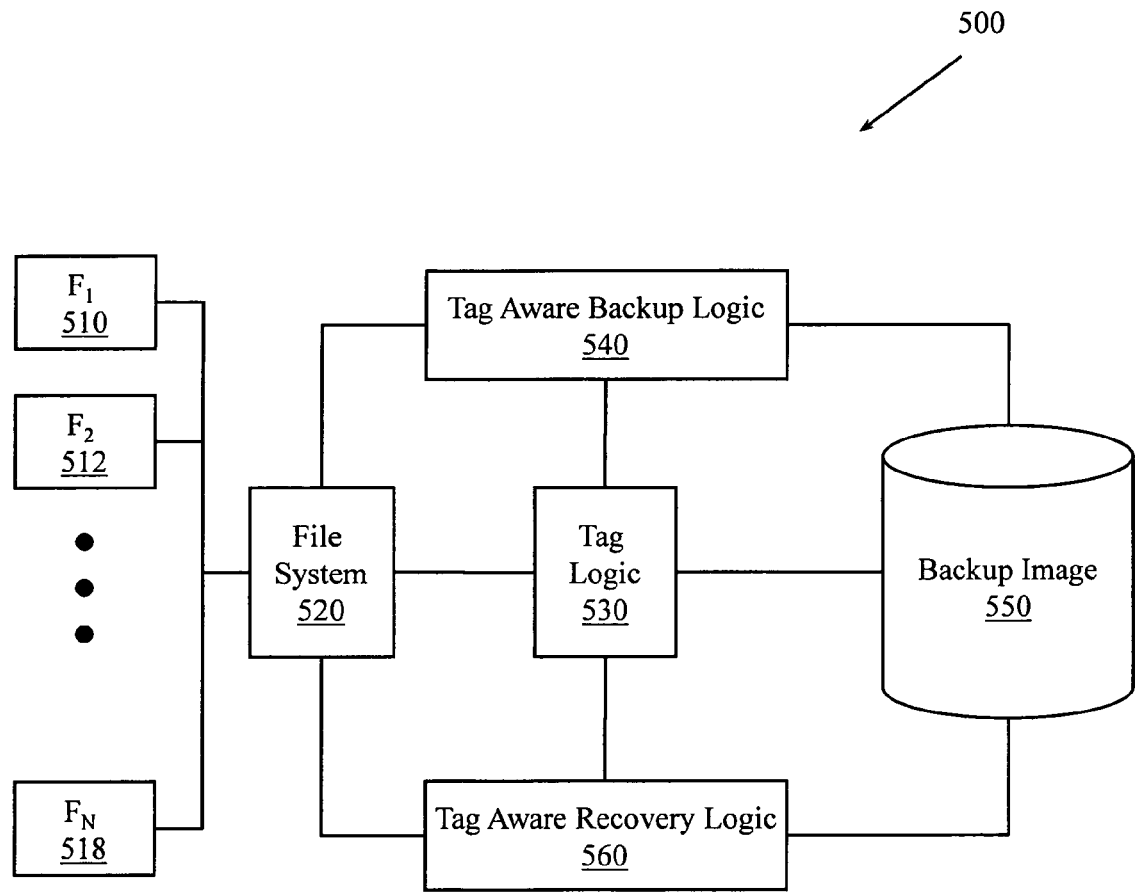
FIG. 5 illustrates another example system associated with tag based file system backup and recovery.

FIG. 5 illustrates a system 500 that performs selective tag-based backup and/or recovery. System 500 includes some elements similar to system 400 (FIG. 4). For example, system 500 includes a tag-aware backup logic 540 that participates in producing a backup image 550 that includes files $F_1$ 510, and $F_2$ 512 through $F_N$ 518 available in file system 520. System 500 also includes a tag logic 530 to selectively tag files for inclusion in the backup image 550. In one example, the tag logic 530 is to present a graphical user interface to facilitate identifying a file to be tagged, to facilitate identifying a recovery inclusion tag with which a file is to be tagged, to facilitate identifying a recovery tag to use to select files from backup image 550, and so on. In one example, the identifying performed by the GUI provided by the tag logic 530 file does not include specifying a path name.

While tag logic 530 may mark files for selective inclusion, in some examples tag-aware backup logic 540 may place both files that are tagged and files that are not tagged in backup image 550. Additionally, in one example, backup image 550 may include files provided by a non-tag-aware logic that simply places a set of files in backup image 550 without regard to whether a file is tagged. Therefore, both tagged files and files that are not tagged may be available in backup image 550 for selective processing by a tag-aware recovery logic 560.

Tag-aware recovery logic 560 may receive a request to provide a recovery file from backup image 550. The recovery file may be associated with a recovery tag processed by tag logic 530. Therefore the tag-aware recovery logic 560 may selectively provide the recovery file upon determining that the recovery file is associated with the recovery tag. Determining whether the recovery file is associated with the recovery tag may include, for example, examining metadata in the recovery file, examining metadata associated with the recovery file, and so on. In one example, a string comparison may be made between recovery file metadata and a recovery tag to determine whether a match exists. In one example an exact match may be required before a file will be provided while in another example an inexact match may satisfy the string comparison. While a string comparison is described, it is to be appreciated that other determinations may be based on other protocols. For example, a numeric tag may produce a positive determination based on relationships including greater than, less than, within, and so on. In this way a numeric tag may indicate inclusion for a set of tags rather than for an individual tag. While string and numeric tag values are described, one skilled in the art will appreciate that other tag values and tag comparison techniques may be employed. Thus, in different examples, the tag-aware recovery logic 560 is to determine that the recovery file is associated with the recovery tag by examining a tag encoded in metadata in the recovery file, and/or by examining a tag encoded in metadata associated with the recovery file.

Figure 6:
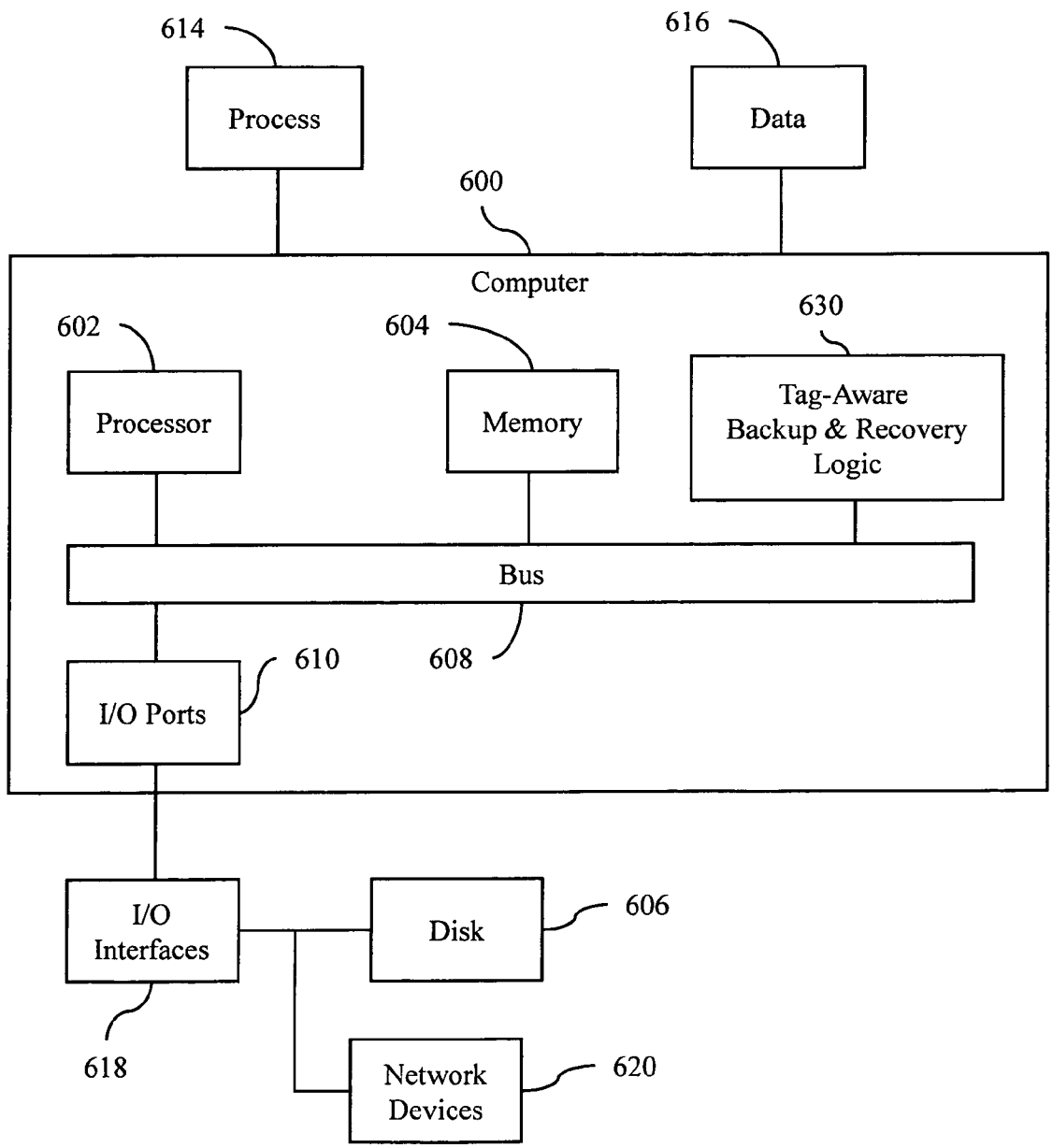
FIG. 6 illustrates an example of a computing environment in which example systems and methods, and equivalents, may operate.

FIG. 6 illustrates an example of a computing device in which example systems and methods described herein, and equivalents, may operate. The example computing device may be a computer 600 that includes a processor 602, a memory 604, and input/output ports 610 operably connected by a bus 608. In one example, the computer 600 may include a tag-aware backup and recovery logic 630 to tag files and facilitate selective tag-based recovery. In different examples, the logic 630 may be implemented in hardware, firmware, and/or combinations thereof. While the logic 630 is illustrated as a hardware component attached to the bus 608, it is to be appreciated that in one example, the logic 630 could be implemented in the processor 602.

Logic 630 may provide means (e.g., hardware, software, firmware) for selectively tagging a file for inclusion in a snapshot-based backup image by associating a tag with the file. In one example the snapshot-based backup image may include both tagged files and files that are not tagged. Logic 630 may also include means for selectively adding a file to the snapshot-based backup image upon determining, for example, that the file has experienced a write event and that the file is associated with a tag. In this example, tagged files will be added to the backup image by logic 630. In one example, the fact that tagged files may be added to the backup image by logic 630 does not preclude non-tagged files from being added to the backup image by other logics. Logic 630 may also include means for receiving a request to provide a recovery file from the snapshot-based backup image. The request is to include a recovery tag so that specific files that are related to the recovery tag may be extracted from the backup image. Thus, while a backup image may include a thousand files, it may be possible to extract a specific file or set of files from the thousand files based on the extracted files having the recovery tag in their metadata. Thus, logic 630 may provide means for selectively providing the recovery file upon determining that the recovery file is associated with the recovery tag.

The logic 630 may be implemented, for example, as an ASIC programmed to perform all and/or portions of method 100 (FIG. 1), method 200 (FIG. 2), and/or method 300 (FIG. 3). Alternatively, the logic 630 may be presented to computer 600 as data 616 and/or a process 614 that are temporarily stored in memory 604. The logic 630 may also be implemented, for example, as processor executable instructions that can be executed by processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the I/O interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the I/O interfaces 618, and/or the I/O ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-readable storage medium that stores instructions that when executed by a computer cause the computer to perform a method, the method comprising:

receiving a signal that identifies a file to be selectively processed by a tag-aware backup logic configured to produce a recovery image that includes a first set of files having a relationship with a first recovery image inclusion tag and a set of files not having a relationship with a recovery image inclusion tag;

establishing a relationship between the file and a recovery image inclusion tag, where establishing the relationship between the file and the recovery image inclusion tag includes one or more of:

encoding the recovery image inclusion tag into metadata in the file; and encoding the recovery image inclusion tag into metadata associated with but not in the file;

controlling the tag-aware backup logic to selectively automatically add the file to the recovery image based, at least in part, on the relationship between the file and the recovery image inclusion tag; and controlling the tag-aware backup logic to store the recovery image on a computer-readable storage medium.

2. The computer-readable storage medium of claim 1, the signal being received from a file selection logic that provides a graphical user interface (GUI) that displays a graphical representation of an element of a file system, where the graphical representation facilitates selecting the element without specifying a path name.

3. The computer-readable storage medium of claim 2, where selecting the element without specifying the path name includes not receiving a user input that specifies the path name.

4. The computer-readable storage medium of claim 1, where the tag-aware backup logic is to add the file to the recovery image using copy-on-write snapshot processing.

5. The computer-readable storage medium of claim 1, where the recovery image includes a second set of files associated with a second recovery image inclusion tag.

6. The computer-readable storage medium of claim 1, including establishing a relationship between the file and a set of recovery image inclusion tags.

7. A computer-implemented method, comprising:
accessing a recovery image that includes a first set of files having a relationship with a recovery image inclusion tag, and a set of files not having a relationship with a recovery image inclusion tag;
receiving a signal that identifies a recovery tag associated with a file to be recovered from the recovery image, where the recovery tag is provided by a file selection logic that provides a Graphical User Interface (GUI) that displays a graphical representation of a portion of a file system and facilitates selecting the file; and
controlling a tag-aware recovery logic to selectively automatically provide a file from the recovery image based, at least in part, on a relationship between the recovery tag and the recovery image inclusion tag, wherein the recovery image inclusion tag is one or more of, embedded in metadata in the file, and embedded in metadata associated with the file.

8. A computer-readable storage medium that stores instructions that when executed by a computer cause the computer to perform a method, the method comprising:
accessing a recovery image that includes a set of files having a relationship with a recovery image inclusion tag, where the recovery image inclusion tag is one or more of, embedded in metadata in the file, and embedded in metadata associated with the file;
receiving a signal that identifies a recovery tag associated with a file to be recovered from the recovery image; and
controlling a tag-aware recovery logic to selectively automatically provide a file from the recovery image based, at least in part, on a relationship between the recovery tag and the recovery image inclusion tag,
where the recovery image includes a first set of files having a relationship with a recovery image inclusion tag, a second set of files associated with a second recovery image inclusion tag, and a set of files not having a relationship with a recovery image inclusion tag.

9. A computer-implemented method, comprising:
receiving a first signal that identifies a file to be selectively processed by a tag-aware backup logic that produces a recovery image, the first signal being received from a file selection logic that provides a graphical user interface (GUI) that displays a graphical representation of an element of a file system, where the graphical representation facilitates selecting the element without specifying a path name, where the recovery image includes a first set of files having a relationship with a first recovery image inclusion tag, a second set of files associated with a second recovery image inclusion tag, and a set of files not having a relationship with a recovery image inclusion tag;
establishing a relationship between the file and a recovery image inclusion tag by performing one or more of, encoding the recovery image inclusion tag into metadata in the file, and encoding the recovery image inclusion tag into metadata associated with but not in the file;
controlling the tag-aware backup logic to selectively automatically add the file to the recovery image based, at least in part, on the relationship between the file and the recovery image inclusion tag, the tag-aware backup logic being configured to perform copy-on-write snapshot processing;
controlling the tag-aware backup logic to store the recovery image on a computer-readable storage medium, where the recovery image is configured to include a set of files having relationships with a set of recovery image inclusion tags;
accessing the recovery image in response to receiving a second signal, where the second signal identifies a recovery tag associated with a recovered file to be recovered from the recovery image, where the recovery tag is provided by the file selection logic; and
controlling a tag-aware recovery logic to selectively automatically provide the recovered file from the recovery image based, at least in part, on a relationship between the recovery tag and one or more of, a tag encoded in metadata in the recovered file, and a tag encoded in metadata associated with the recovered file.

10. The method of claim 9, where selecting the element without specifying the path name includes not receiving a user input that specifies the path name from a command-line user interface.

11. A computer-readable storage medium that stores instructions that when executed by a computer cause the computer to perform a method, the method comprising:
configuring a file to be included in a backup image by associating a tag with the file by embedding a tag in metadata in the file, or embedding a tag in metadata associated with but not in the file, where configuring the file includes receiving a signal from a Graphical User Interface (GUI) that displays a graphical representation of an element of file system, where the graphical representation facilitates selecting the element without out specifying a path name; and
selectively adding a file to a backup image based, at least in part, on whether a file has been configured by the tag logic to be included in a backup image, where the backup image includes a first set of files having a relationship with a first recovery image inclusion tag, a second set of files associated with a second recovery image inclusion tag, and a set of files not having a relationship with a recovery image inclusion tag.

12. The computer-readable storage medium of claim 11, where selectively adding a file to the backup image performing a copy-on-write snapshot procedure where the file is added to the backup image upon determining that the file has experienced a write operation.

13. The computer-readable storage medium of claim 11, where selecting the element without specifying the path name includes not receiving a user input that specifies the path name from a command-line user interface.

14. A computer system, comprising:
a tag logic to configure a file to be included in a backup image by associating a tag with the file by performing one or more of, embedding the tag in metadata in the file, and embedding the tag in metadata associated with but not in the file;

a tag-aware backup logic to selectively add a file to a backup image based, at least in part, on whether a file has been configured by the tag logic to be included in a backup image; and a tag-aware recovery logic to receive a request to provide from a backup image a recovery file associated with a recovery tag, and to selectively provide the recovery file upon determining that the recovery file is associated with the recovery tag.

15. The computer system of claim 14, where the tag-aware recovery logic is to determine that the recovery file is associated with the recovery tag by examining one or more of, a tag encoded in metadata in the recovery file, and a tag encoded in metadata associated with the recovery file.

16. The computer system of claim 15, where the tag logic is to present a graphical user interface to facilitate one or more of, identifying the file, and identifying the recovery tag, where identifying the file does not include specifying a path name.

* * * * *

UNITED STATES PATENT AND TRADEMARK OFFICE
CERTIFICATE OF CORRECTION

| | | |
|---|---|---|
| PATENT NO. | : 7,882,069 B2 | Page 1 of 1 |
| APPLICATION NO. | : 12/070528 | |
| DATED | : February 1, 2011 | |
| INVENTOR(S) | : Glover et al. | |

It is certified that error appears in the above-identified patent and that said Letters Patent is hereby corrected as shown below:

In column 7, line 60, after "readable" insert -- storage --.

Signed and Sealed this
Twentieth Day of September, 2011

David J. Kappos
*Director of the United States Patent and Trademark Office*